US012002380B2

(12) United States Patent
Keatley

(10) Patent No.: US 12,002,380 B2
(45) Date of Patent: Jun. 4, 2024

(54) CARD HOLDER FLORAL PICK

(71) Applicant: Sandra J. Keatley, Castle Rock, WA (US)

(72) Inventor: Sandra J. Keatley, Castle Rock, WA (US)

( * ) Notice: Subject to any disclaimer, the term of this patent is extended or adjusted under 35 U.S.C. 154(b) by 0 days.

(21) Appl. No.: 17/536,376

(22) Filed: Nov. 29, 2021

(65) Prior Publication Data

US 2023/0169892 A1 Jun. 1, 2023

(51) Int. Cl.
*G09F 1/10* (2006.01)
*B67C 11/02* (2006.01)

(52) U.S. Cl.
CPC ................ *G09F 1/10* (2013.01); *B67C 11/02* (2013.01)

(58) Field of Classification Search
CPC . G09F 1/10; G09F 3/206; B67C 11/02; B67C 11/00; A01G 9/006; A01G 27/006; A01G 29/00
USPC ................ 40/661.08, 645; 222/527; 47/48.5; 141/337, 338
See application file for complete search history.

(56) References Cited

U.S. PATENT DOCUMENTS

| | | | | | |
|---|---|---|---|---|---|
| 1,630,373 | A * | 5/1927 | Combs | A47F 5/112 | 211/85.2 |
| 2,100,888 | A * | 11/1937 | Vine | B67C 11/02 | 229/116 |
| 2,108,349 | A * | 2/1938 | Rasmussen | A47F 5/00 | 40/539 |
| 2,880,928 | A * | 4/1959 | Merrill | A47G 25/20 | 223/71 |
| 3,292,796 | A * | 12/1966 | Paige | A47F 5/114 | 211/132.1 |
| 4,393,622 | A * | 7/1983 | Gallo, Sr. | A01G 5/06 | 40/645 |
| 5,794,672 | A * | 8/1998 | Goldberg | A01G 5/06 | D7/700 |
| 2006/0285998 | A1* | 12/2006 | Barksdale | B67C 11/02 | 422/400 |
| 2008/0041491 | A1* | 2/2008 | Salani | B67C 11/02 | 141/337 |

* cited by examiner

*Primary Examiner* — Cassandra Davis
(74) *Attorney, Agent, or Firm* — Garth Janke, LLC

(57) ABSTRACT

A card holder floral pick defining an elongate hollow tube having opposed top and bottom ends and openings adapted to provide a funneling function, for funneling any liquid introduced into the tube at the top end out the bottom end under the influence of gravity, with two substantially identical slots at the top end of the tube that are angularly spaced-apart from each other about an elongate axis of the tub, for holding an enclosure card.

10 Claims, 4 Drawing Sheets

CARD HOLDER FLORAL PICK

FIELD OF INVENTION

The present invention relates to picks for holding greeting cards in a floral arrangement.

BACKGROUND

Floral bouquets or arrangements are commonly ordered by one person to be delivered to another, such as on a celebratory occasion like Mother's day. The arrangements will often be accompanied with a greeting or message card called a florist card, which may or may not be provided in an envelope. Generally herein a florist card, whether with or without an envelope, will be referred to as an "enclosure card."

The enclosure card is inserted into what is often referred to as a "card holder floral pick" (which may alternatively be referred to herein as a "pick"), and the pick is inserted into the floral arrangement so that the enclosure card may be prominently displayed amongst the flora. The pick is used to stake the enclosure card to the floral arrangement similar to how a stake is used to stake a yard sign to the ground.

SUMMARY

A card holder floral pick is disclosed herein. In one embodiment, the card holder floral pick defines an elongate hollow tube having opposed top and bottom ends and openings adapted to provide a funneling function, for funneling any liquid introduced into the tube at the top end out the bottom end under the influence of gravity.

The pick includes two substantially identical slots at the top end of the tube that are angularly spaced-apart from each other about an elongate axis of the tube for holding an enclosure card.

The card holder floral pick may be provided in the form of a blank having opposed edges which is adapted to define the elongate hollow tube as a consequence rolling or folding the blank and joining the edges.

The tube may be formed at least primarily of paper, and may be at least partially coated with a hydrophobic material to increase its water resistance.

A corresponding method is also disclosed, of rolling or folding the blank and joining at least two edges thereof together to form the tube.

It is to be understood that this summary is provided as a means of generally determining what follows in the drawings and detailed description and is not intended to limit the scope of the invention. Objects, features and advantages of the invention will be readily understood upon consideration of the following detailed description taken in conjunction with the accompanying drawings.

DESCRIPTION OF PREFERRED EMBODIMENTS

The present inventor recognized an opportunity to provide a card holder floral pick having an additional function over and above just holding an enclosure card. That is, floral arrangements are often provided by florists in decorative vases that are partially filled with water to keep the flora hydrated. The recipients of these arrangements often desire to maintain the water level to prolong the life of the flora, but may have difficulty doing it. They may not have ready means available to direct the water through the flora to where it needs to be, near the bottom of the vase. So oftentimes some of the water that they try to introduce into the vase will be redirected by the crown of leaves and/or flowers in the arrangement extending above the vase to points outside the vase, making a bit of a mess.

Figure 1:
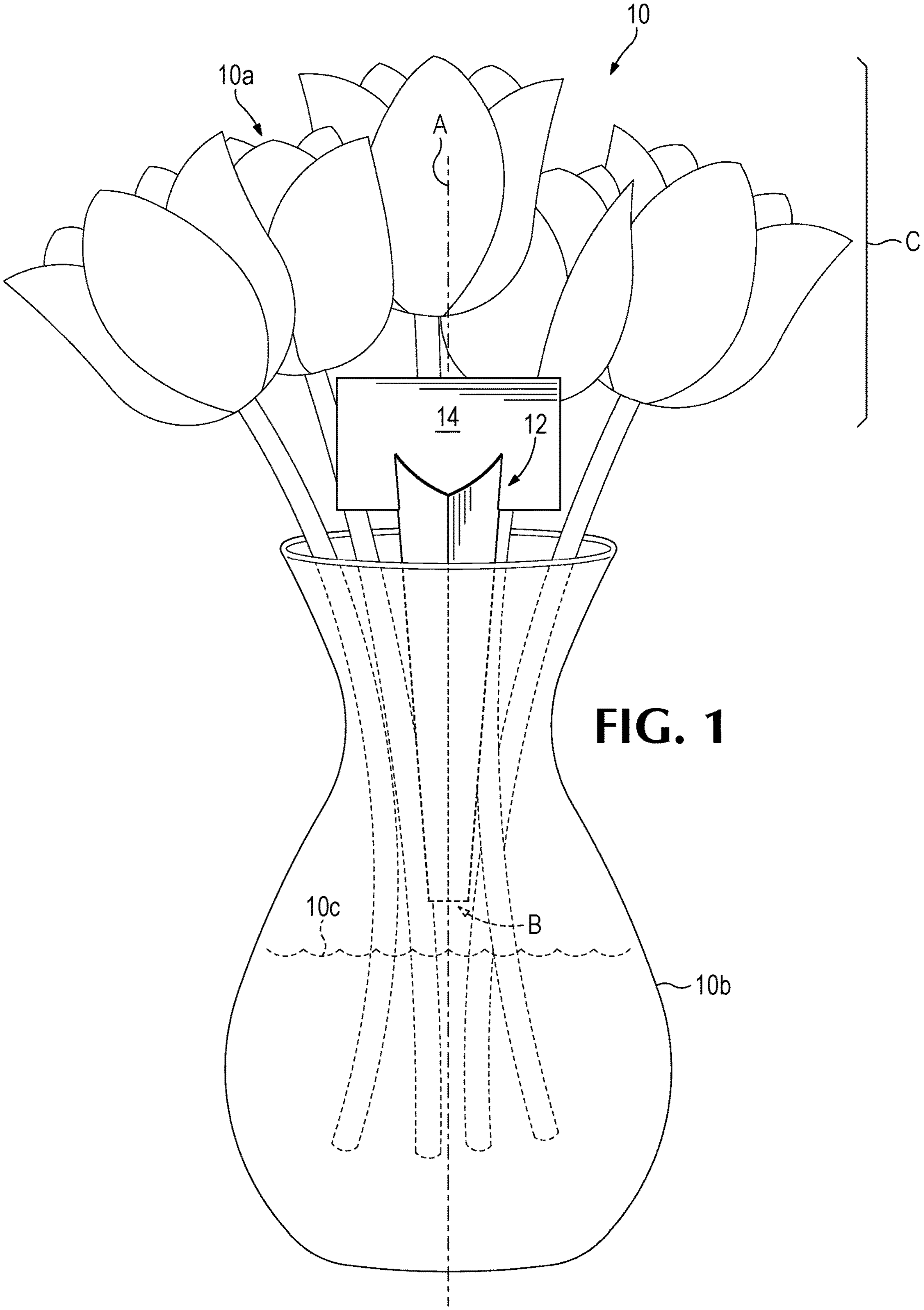
FIG. 1 is an elevation view of a preferred embodiment of a card holder floral pick according to the present invention provided in a floral arrangement.

FIG. 1 shows a preferred embodiment 12 of card holder and floral pick according to the invention in a typical floral arrangement 10. The floral arrangement 10 typically includes flora 10*a*, in a vase 10*b*, that has been partially filled with water 10*c*. The flora 10*a* extend above the brim of the base 10*b* to define a crown "C" of decorative flowers and leaves that are intended for display.

Figure 6:
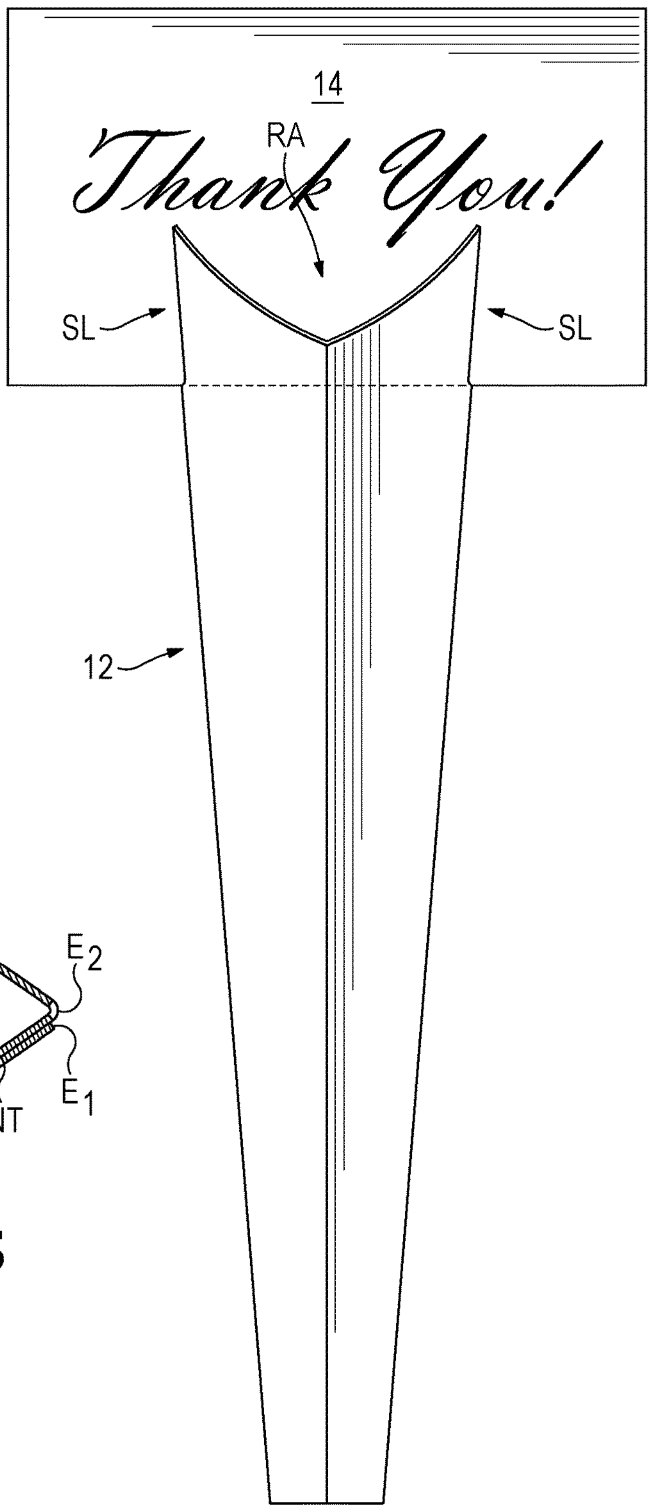
FIG. 6 is yet another elevation view of the card holder and floral pick of FIG. 1 formed as shown in FIG. 3, in the stiffened condition of FIG. 4, and with an enclosure card inserted therein.

FIG. 1 shows that the pick 12 supports a typical enclosure card 14, which is typically nominally either 2 inches in height by 3 inches in width, or 4 inches in height by 6 inches in width (where the height is measured along the vertical and the width is measured along the horizontal with the enclosure card oriented as shown in FIGS. 1 and 6). The enclosure card may be formed of a florist card by itself, or a florist card in an envelope.

The florist card card is typically formed of 10 pt. card stock but other sizes could be employed. The florist card may be in the form of a single sheet (or "flat card"), or it may be folded to create multiple sheets. These options, in addition to the option of inserting the florist card in an envelope, result in a range of possible thicknesses (measured perpendicular to the plane of FIGS. 1 and 6) of the finished enclosure card, which when 10 pt. card stock is used for the florist card, may be between about 0.009 inches and 0.36 inches. The pick 12 is intended to support the enclosure card within the floral crown for display.

The pick 12 has a hollow, elongated funnel configuration, to facilitate introducing water into the vase, below the crown of the flora, with less chance of spilling water outside the vase.

Figure 2:
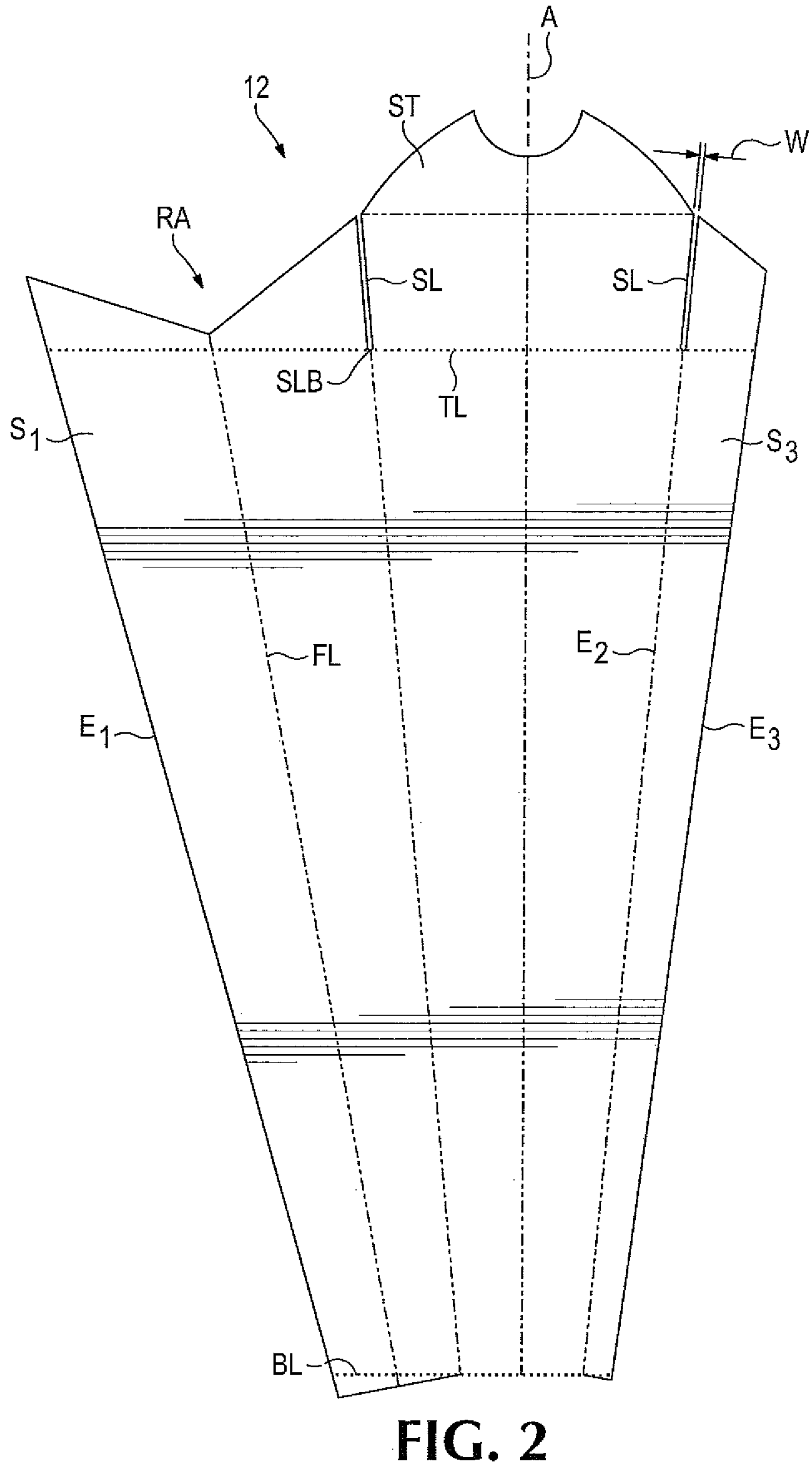
FIG. 2 is an elevation view of the card holder floral pick of FIG. 1, shown in a two-dimensional, planar configuration.
Figure 3:
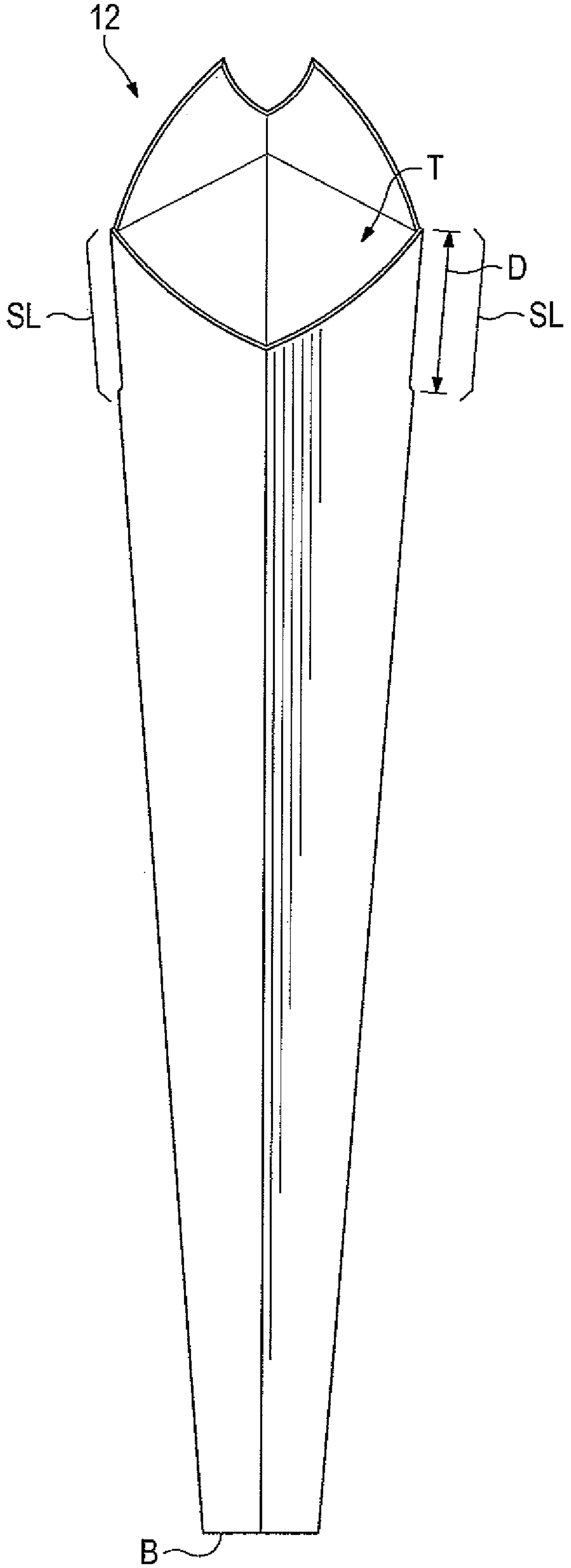
FIG. 3 is another elevation view of the card holder floral pick of FIG. 1, shown as having been formed into a three-dimensional configuration in an un-stiffened condition.
Figure 4:
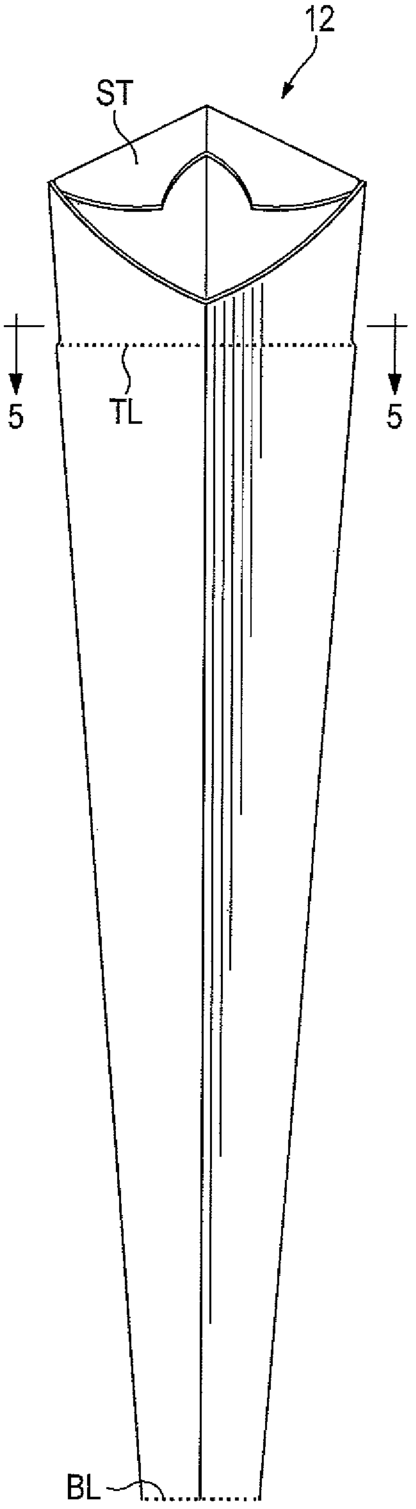
FIG. 4 is still another elevation view of the card holder floral pick of FIG. 1, formed as shown in FIG. 3 and manipulated so as to place it in a stiffened condition.
Figure 5:
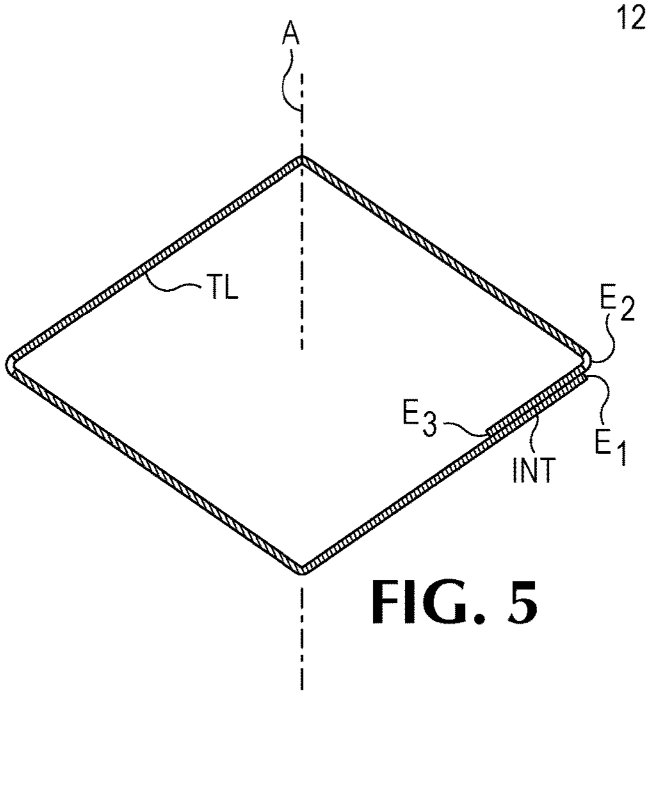
FIG. 5 is an isometric, cross-sectional view of the card holder and floral pick of FIG. 1 formed as shown in FIG. 4, taken along a 5-5 thereof.

FIG. 2 shows the pick 12 in a two-dimensional, planar configuration or "blank;" FIGS. 3 and 4 show the pick 12 formed into a three-dimensional configuration; and FIG. 5 shows the pick in the three-dimensional configuration of FIG. 4 in cross-section. The blank may be formed by die-cutting a flat sheet of material, such as paper or card stock.

To achieve the three dimensional configuration of the pick 12 from the two-dimensional blank shown in FIG. 2, the pick 12 may be folded along fold lines "FL," shown as dash-double-dot lines; edges "$E_1$," "$E_2$," and "$E_3$" as shown in FIG. 2 may be joined together as shown in FIG. 5; and surfaces "$S_1$" and "$S_3$" as shown in FIG. 2 may be bonded at the interface "INT" shown in FIG. 5 thus created, such as with a contact or pressure-sensitive adhesive.

The fold lines FL may simply be drawn on the blank as lines or marks to indicate where to fold the blank, and/or the blank may be scored, pre-folded, or otherwise weakened along these lines to further facilitate folding the blank along these lines.

As one alternative, the fold lines could be omitted and the two-dimensional blank could be bent into conical shape three-dimensional shape rather than folded into a box-like shape.

With reference to FIG. 3, the pick when formed into an elongate, hollow, three dimensional configuration has a top or inlet opening "T" and a bottom or outlet opening "B," where the inlet opening has a larger area than the outlet opening so that the pick functions as a funnel. FIG. 5 shows the pick 12 after it has been formed into the three dimensional configuration, further with a stiffening tab "ST" folded down towards the top opening T, to place the unstiffened three dimensional configuration of the pick into a stiffened condition to prevent inadvertent collapse of the openings T and B.

FIG. 2 also shows elongate voids "SL" in the two-dimensional configuration of the pick 12, that define slots in the three dimensional configuration for receiving the enclosure card, as shown in FIG. 6. Also shown in FIG. 6 and also FIG. 2 is a relief area "RA" that enhances visibility of the card.

The slots SL may provided so that there is enough friction between the slots and the enclosure card (i.e., with or without an envelope) that inserting the enclosure card will serve to stiffen the pick without need or use of the stiffening tab. To serve this additional function, it is best to provide the slots SL diametrically opposed from one another (i.e., 180 degrees apart, measured around the elongate axis A) as shown in the drawings. But this is not essential.

The slots SL will better support the enclosure card such as shown in FIG. 1 if the enclosure card is smaller, if the slots are deeper (dimension "D" in FIG. 3), and if the width of the slots (dimension "W" in FIG. 2) is more tightly matched to the thickness of the enclosure card. For supporting the larger, 4×6 enclosure card, a good slot depth D is about 1.0 to 1.25 inches.

The slot width W could be sized to fit the thickness of the enclosure card, or could be even larger. But preferably the width W is less than the thickness of the enclosure card, to better grip the enclosure card, and it has been found that simply cutting (as with a pair of scissors) or slicing the blank to create the slot works well, in which case the width W of the slots is essentially zero. In general, to achieve any desired length and width of the slots, the slots could be formed as part of the same process, such as the die-cutting previously mentioned, that creates or defines the blank more generally.

The pick 12 when it is fully configured has an elongate, hollow, three-dimensional configuration that functions as a funnel, as a consequence of having openings at each end, where the top or inlet opening "T" at the top end of the pick has a larger area than the bottom or outlet opening "B" at the bottom end of the pick.

With the pick oriented so that the axis A is vertical, the inlet opening T of the pick 12 is considered to be below and directly adjacent the bottoms "$SL_B$" (see FIG. 2) of the slots SL, and is defined by the dotted, imaginary line "TL" referenced in FIGS. 2 and 4, perpendicular to the axis A. The area of the inlet opening T is thus the area enclosed by the line TL as shown in FIG. 4, measured perpendicular to the axis A, which is the maximum opening size. At higher elevations, water introduced into the opening could leak out of the pick through the slots SL, and at still higher elevations, through the relief area RA.

The outlet opening B of the pick 12 is defined by the dotted, imaginary line "BL" referenced in FIG. 2, also perpendicular to the axis A, which is the minimum opening size. The line BL cannot be any lower or it would start to encompass space outside the confines of the blank, which would serve to increase the opening size.

Note that in the two-dimensional blank, the line BL is not congruent with the bottom of the pick "BOP," whereas when the pick is folded into the three-dimensional configuration shown in FIGS. 3 and 4, the line BL becomes congruent with BOP. The deviations from congruence between BL and BOP in the blank as shown in FIG. 2 were intentionally provided to achieve the congruence that can be seen by comparing FIGS. 3 and 4.

The above descriptions of the inlet and outlet openings T and B are specific to the pick 12. It should be understood that numerous variations may be provided. For example, the side of the pick could be perforated to create additional outlet openings and if the sum total of the area of the outlet opening at the bottom of the funnel and the areas of these additional outlet openings are less than the area of the inlet opening, the pick would still function as a funnel. The outlet opening B could be eliminated in favor of such openings through the side of the funnel. The inlet opening could have a divider and still function the same. These are just a few examples.

As noted previously, the pick 12 functions as a funnel. That generally means that an incompressible fluid such as water introduced into the funnel at the top end of the funnel, under the influence of gravity so as to flow toward the bottom end of the funnel, will tend to back-up in the funnel if it is introduced too quickly, because the opening (or openings) at the top end of the funnel allow for introducing the fluid into the funnel at a greater rate than the opening (or openings) at the bottom end of the funnel (or through sides of the funnel) allow for draining the fluid from the funnel.

Generally, a pick according to the invention may have any combination of inlet and outlet openings, having any combination of sizes and/or shapes, that serve to provide this funneling function.

It is of course not necessary to configure the three-dimensional pick from a two-dimensional blank. Picks according to the present invention could be provided fully configured. But it facilitates shipping and storing the picks to provide them in forms that can be collapsed so that they take up less space, and two-dimensional blanks require the bare minimum of storage space.

The pick 12 may be formed of plastic or any other desired material, but it is believed to be most economically and therefore most desirably formed of paper, which may be coated with wax or any other desired hydrophobic material if desired to maintain its stiffness. However, the pick may be formed of any desired material or combinations of materials, including plastic.

It is to be understood that, while a specific configuration of a card holder floral pick according to the invention has been shown and described as being preferred, other configurations could be utilized, in addition to those already mentioned, without departing from the principles of the invention.

The terms and expressions which have been employed in the foregoing specification are used therein as terms of description and not of limitation, and there is no intention in the use of such terms and expressions to exclude equivalents of the features shown and described or portions thereof, it being recognized that the scope of the invention is defined and limited only by the claims which follow.

The invention claimed is:

1. A method for forming a card holder floral pick, comprising:

folding a blank and joining at least two edges thereof together so as to form an un-stiffened, elongate hollow tube having opposed top and bottom ends and corresponding top and bottom openings adapted to provide a funneling function, for funneling any liquid introduced into the tube at the top end through the top opening and out the bottom end through the bottom opening under the influence of gravity, wherein the blank comprises two substantially identical slots at the top end of the tube that are angularly spaced apart from one another about an elongate axis of the tube for holding an enclosure card, the slots thereby defining therebetween two opposed edges of the top end opening of the tube, wherein at least a portion of one of said two opposed edges is higher, relative to the bottom end opening of the tube, than the entirety of the other of said two opposed edges, and wherein the blank further comprises a stiffening tab proximate the top opening of the tube, depending from said portion; and folding the stiffening tab to bring the un-stiffened tube into a stiffened condition.

2. The method of claim 1, further comprising inserting an enclosure card in the slots.

3. The method of claim 2, wherein the slots are substantially diametrically opposed from each other about an elongate axis of the tube.

4. The method of claim 2, wherein the blank comprises a fold line and the step of folding the blank comprises folding the blank on the fold line.

5. The method of claim 2, further comprising forming the blank at least primarily of paper.

6. The method of claim 5, further comprising at least partially coating the blank with a hydrophobic material.

7. The method of claim 1, wherein the slots are substantially diametrically opposed from each other about an elongate axis of the tube.

8. The method of claim 1, wherein the blank comprises a fold line to facilitate folding the blank to define the elongate hollow tube, the method further comprising folding the blank on the fold line.

9. The method of claim 1, further comprising forming the blank at least primarily of paper.

10. The method of claim 9, further comprising at least partially coating the blank with a hydrophobic material.

* * * * *